United States Patent
Tropee et al.

(10) Patent No.: US 11,299,025 B2
(45) Date of Patent: Apr. 12, 2022

(54) MOTOR VEHICLE EQUIPPED WITH AN IMPACT PROTECTION DEVICE FOR UNDERFLOOR ELEMENTS

(71) Applicant: PSA AUTOMOBILES SA, Poissy (FR)

(72) Inventors: Nicolas Tropee, Belfort (FR); Ludovic Meresse, Arcey (FR)

(73) Assignee: PSA AUTOMOBILES SA, Poissy (FR)

(*) Notice: Subject to any disclaimer, the term of this patent is extended or adjusted under 35 U.S.C. 154(b) by 0 days.

(21) Appl. No.: 17/435,336

(22) PCT Filed: Feb. 5, 2020

(86) PCT No.: PCT/FR2020/050190
§ 371 (c)(1),
(2) Date: Aug. 31, 2021

(87) PCT Pub. No.: WO2020/178493
PCT Pub. Date: Sep. 10, 2020

(65) Prior Publication Data
US 2022/0080819 A1    Mar. 17, 2022

(30) Foreign Application Priority Data

Mar. 7, 2019 (FR) ...................................... 1902308

(51) Int. Cl.
*B60K 1/04* (2019.01)
*B60R 13/08* (2006.01)
*B60K 13/04* (2006.01)

(52) U.S. Cl.
CPC ................ *B60K 1/04* (2013.01); *B60K 13/04* (2013.01); *B60K 2001/0438* (2013.01); *B60R 13/0869* (2013.01); *B60R 13/0876* (2013.01)

(58) Field of Classification Search
CPC .. B60K 1/04; B60K 13/04; B60K 2001/0438; B60R 13/0869; B60R 13/0876
(Continued)

(56) References Cited

U.S. PATENT DOCUMENTS 10,322,757 B2*   6/2019   Shimoda .............. B62D 21/157
2016/0226041 A1*  8/2016  Jackson ................ H01M 50/20
(Continued)

FOREIGN PATENT DOCUMENTS

DE    102016100879 A1    8/2016
FR       3036359 A1    11/2016
(Continued)

OTHER PUBLICATIONS

International Search Report for PCT/FR2020/050190 dated May 14, 2020.
Written Opinion for PCT/FR2020/050190 dated May 14, 2020.

*Primary Examiner* — James A Shriver, II
*Assistant Examiner* — Hilary L Johns
(74) *Attorney, Agent, or Firm* — Sandberg Phoenix & von Gontard, P.C.

(57) ABSTRACT

A motor vehicle comprises an impact protection device for a battery (1) mounted under the floor of the vehicle and separated from an exhaust muffler (2) by an intermediate heat shield (3), wherein, the device comprises a cushion (4) fastened opposite the battery (1) on the heat shield (3), the cushion (4) being able to deform when the muffler (2) moves forward contacting the battery (1) in order to absorb the kinetic energy resulting from an impact on the vehicle.

10 Claims, 1 Drawing Sheet

(58) Field of Classification Search
USPC .......................................................... 180/271
See application file for complete search history.

(56) References Cited

U.S. PATENT DOCUMENTS

| | | | |
|---|---|---|---|
| 2016/0329538 A1* | 11/2016 | Hughes | H01M 10/052 |
| 2018/0072352 A1* | 3/2018 | Shimoda | B60R 16/04 |
| 2019/0061508 A1 | 2/2019 | Sawatzki et al. | |
| 2020/0076026 A1* | 3/2020 | Ohkuma | H01M 10/613 |

FOREIGN PATENT DOCUMENTS

| | | |
|---|---|---|
| FR | 3036664 A1 | 12/2016 |
| FR | 3056950 A1 | 4/2018 |

* cited by examiner

MOTOR VEHICLE EQUIPPED WITH AN IMPACT PROTECTION DEVICE FOR UNDERFLOOR ELEMENTS

CROSS-REFERENCE TO RELATED APPLICATIONS

This application is the US National Stage under 35 USC § 371 of International Application PCT/FR2020/050190 filed 5 Feb. 2020 which claims priority to French Application No. 1902308 filed 7 Mar. 2019, both of which are incorporated herein by reference.

BACKGROUND

The invention relates to a motor vehicle equipped with an impact protection device for underfloor elements.

In particular, the invention relates to a rear impact protection device for the traction battery mounted in front of the exhaust muffler under the floor of hybrid vehicles.

Motor vehicles are generally equipped with a muffler, which is mounted on the exhaust line under the floor and at the rear of the vehicle.

On certain vehicles, and in particular on plug-in hybrid vehicles (PHEV type), this muffler is mounted behind the traction battery. The muffler and the battery are separated by an intermediate heat shield that ensures the protection of the battery from heat radiation emanating from the muffler.

In the event of a collision, or more generally of an impact at the rear of the vehicle, the muffler is then deformed and/or suddenly moved forward. Since the heat shield generally only consists of a sheet or a thin metal sheet, it cannot prevent the muffler from directly impacting the battery and damaging it severely by generating electrical risks (fire, explosion, etc.).

However, the option of avoiding contact between the muffler and the battery by moving the muffler away is not possible on vehicles with a short overhang.

Another option would be to have a protective frame around the battery, but this solution would weigh down the battery and be excessively expensive.

There are already devices for protecting on-board elements against impacts under the floor of motor vehicles, such as that described in FR3036359. However, this device, which also provides thermal protection, is only intended to protect the tank of the selective catalytic reduction (SCR) system during any direct and vertical contact with the ground, and not from an impact at the rear of the vehicle oriented in a longitudinal direction.

In this context, it has proved necessary to provide new means that are specifically adapted to ensure the mechanical protection of the underfloor elements and, in particular, of the battery in the event of a collision at the rear of the vehicle while respecting compactness and lightness constraints as well as reasonable manufacturing and assembly costs.

SUMMARY

The object is to resolve the technical problems posed by the prior art by proposing to furnish the heat insulating shield with a damping element making it possible to preserve the integrity of the battery during an impact at the rear of the vehicle.

This object is achieved by means of a motor vehicle equipped with an impact protection device for a battery mounted under the floor of said vehicle and separated from an exhaust muffler by an intermediate heat shield, wherein said device comprises a cushion fastened opposite the battery on said heat shield, said cushion being able to deform when the muffler moves toward and contacts the battery, in order to absorb the kinetic energy resulting from an impact on said vehicle.

According to one advantageous feature, the cushion has a larger surface than the face of the battery situated opposite it.

According to another feature, the cushion extends at least over the height of the portion projecting toward the front of the exhaust muffler.

According to an alternative embodiment, the cushion has an extra thickness of between 0.5 and 2.0 cm opposite the portion projecting toward the front of the exhaust muffler.

According to another alternative, the cushion has a uniform thickness of between 0.5 and 2.0 cm.

Preferably, the cushion extends over the entire height of the front face of the exhaust muffler.

According to yet another feature, the cushion is made of a deformable material, the relative density (or specific gravity) of which is between 0.1 and 0.65.

According to another alternative, the cushion is fastened to the front face of the heat shield by gluing.

According to yet another alternative, the cushion and the heat shield are made in one piece.

Another object is a hybrid vehicle equipped with a device having the features mentioned above for the impact protection of the traction battery mounted in front of the muffler, said cushion being intended to absorb the kinetic energy resulting from an impact at the rear of said vehicle.

The invention thus is comprised of using the existing heat shield, in integrating a mechanical protection function with the heat shield, and in positioning the protection device in the most judicious place, that is to say, between the battery and the muffler, which makes it possible not to add a step for assembling additional elements under the vehicle floor.

The protection device equipping the vehicle is simple, reliable and economical because it makes it possible to preserve the integrity of the battery during an impact or a collision at the rear of the vehicle in an efficient manner without it being necessary to provide additional heavy and complex structural means and without modifying the assembly method.

At the time of impact, the cushion comes into contact with the battery over a large area in order to reduce local stresses. Then following the impact, the cushion absorbs the kinetic energy and diffuses it over a large surface, thus avoiding local deformation and the risk of tearing the battery casing.

BRIEF DESCRIPTION OF THE FIGURES

Other features and advantages will emerge on reading the description that follows, with reference to the appended and detailed figures below.

For greater clarity, identical or similar elements are identified by identical reference signs in all of the figures.

DETAILED DESCRIPTION

Naturally, the embodiments illustrated by the figures presented above and described below are given only by way of non-limiting examples. It is explicitly provided that it is possible to propose and combine different embodiments with one another in order to offer others.

A motor vehicle is equipped with a device intended to ensure the protection of the underfloor elements with respect to an impact from the rear, for example, by collision with another vehicle or by colliding with an obstacle while backing up.

In particular, the improved protection device aims to protect, in such circumstances, the traction battery 1 that is mounted in front of the exhaust muffler 2, in particular, under the floor of hybrid vehicles.

Figure 1:
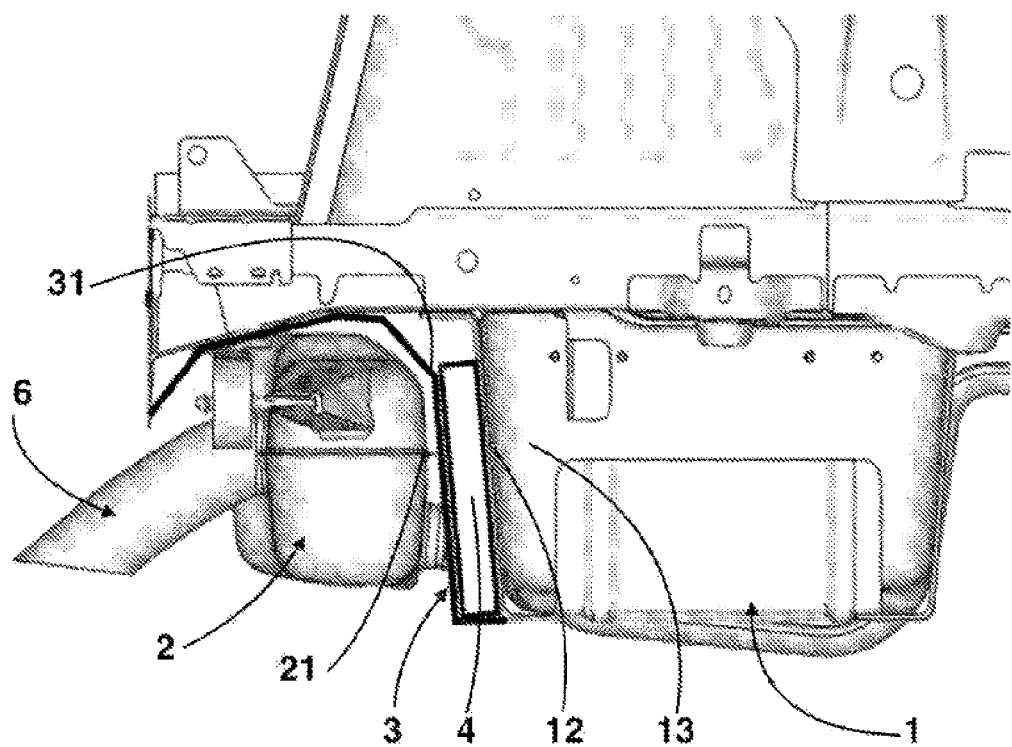
FIG. 1A is a partial side view of an embodiment of the floor of a vehicle equipped with an impact protection device, before impact.
FIG. 1B is a partial side view of an embodiment of the floor of a vehicle equipped with an impact protection device, after impact.
Figure 2:
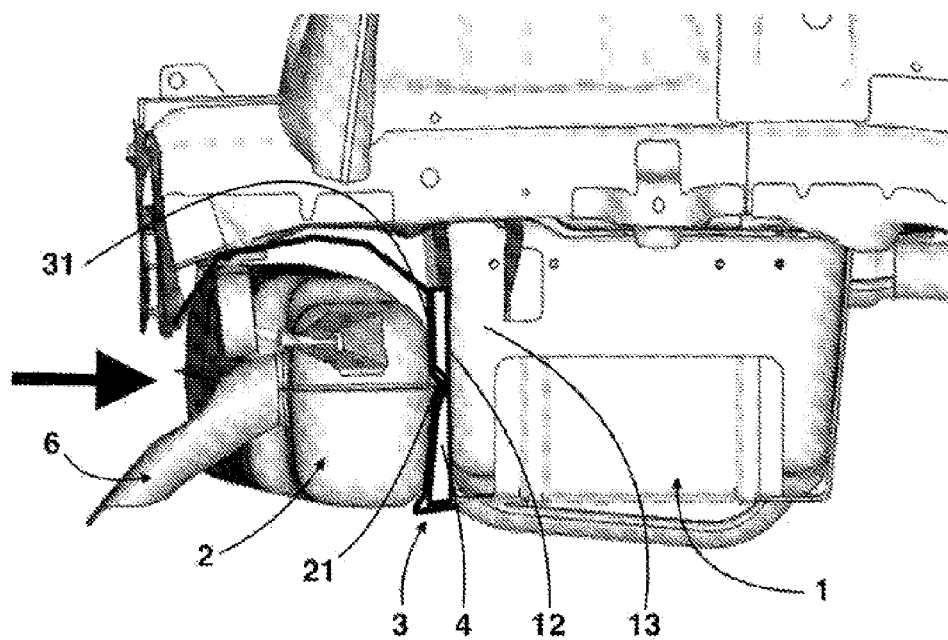

Traditionally, in hybrid vehicles, the traction battery 1 is mounted under the floor and is generally separated from the muffler 2 of the exhaust line 6 by an intermediate heat shield 3, as illustrated in FIG. 1A. This heat shield 3 is generally produced in the form of a metal strip or a thin metal sheet having insulating properties, making it possible to preserve the battery 1 from the heat radiation generated by the muffler 2.

Indeed, the heat given off by the muffler 2 would have the effect of raising the temperature of the electrolyte and of the electrical components to a level that is incompatible with proper operation of the battery 1, and even harmful to the safety of the vehicle.

However, in the event of a rear impact, the kinetic energy resulting from the impact causes the deformation and the forward displacement of the muffler 2 in the direction of the adjacent battery 1.

However, the mechanical strength of the heat shield 3 is not sufficient to prevent the kinetic energy from deforming the battery 1, the casing 13 of which is also not very strong, and therefore does not lead to major risks of electrical incidents.

In order to prevent a rear impact of the vehicle from having such consequences, the face 31 of the heat shield located opposite the battery 1 is equipped with a damping cushion 4.

This cushion 4, fastened to the heat shield 3, is liable to deform when moving the muffler 2 forward in contact with the battery 1 in order to absorb the kinetic energy resulting from an impact at the rear of the vehicle. The integrity of battery 1 is thus preserved during the impact.

The cushion 4 has a larger surface than the face 12 of the battery (or that of its casing 13) located opposite it.

Thus, when an impact occurs at the rear of the vehicle (in the direction of the arrow in FIG. 1B), the cushion 4, pushed by the muffler 2, first contacts the battery 1 over its entire surface in order to reduce the local stresses, then immediately after (depending on the force of the impact), the cushion absorbs the kinetic energy and diffuses it over a large surface while deforming, as illustrated in FIG. 1B.

This deformation of the cushion 4 makes it possible to avoid local deformations and/or the risk of tearing the casing 13 of the battery 1.

On assembly, the cushion 4 extends at least over the height of the portion 21 projecting toward the front of the exhaust muffler 2.

Preferably, the cushion 4 extends over the entire height of the front face of the exhaust muffler 2 and has a thickness of between 0.5 and 2.0 cm. According to a first variant illustrated in FIG. 1A, this thickness is uniform over the entire height of the cushion 4.

Where appropriate and according to another variant that is not shown, the cushion 4 has an extra thickness of between 0.5 and 2.0 cm opposite the portion 21 projecting toward the front of the exhaust muffler 2.

The cushion 4 is made of a deformable material (such as an elastically deformable material), the relative density (or specific gravity) of which is between 0.1 and 0.65.

The cushion 4 is fastened to the front face 31 of the heat shield 3 by gluing. However, other fastening methods (riveting, clipping, etc.) can be used without departing from the scope of the invention.

According to an alternative embodiment not shown, the cushion 4 and the heat shield 3 are made in one piece.

The invention claimed is:

1. A motor vehicle equipped with an impact protection device for a battery mounted under a floor of said motor vehicle and separated from an exhaust muffler by an intermediate heat shield, wherein said impact protection device comprises a cushion fastened opposite the battery on said intermediate heat shield, said cushion being adapted to deform when the exhaust muffler moves toward and contacts the battery in order to absorb kinetic energy resulting from an impact on said motor vehicle.

2. The motor vehicle according to claim 1, wherein the cushion has a larger surface than a face of the battery situated opposite the cushion.

3. The motor vehicle according to claim 1, wherein the cushion extends at least over a height of a portion of the exhaust muffler projecting toward the front of the exhaust muffler.

4. The motor vehicle according to claim 3, wherein the cushion has an extra thickness of between 0.5 and 2.0 cm opposite the portion projecting toward the front of the exhaust muffler.

5. The motor vehicle according to claim 1, wherein the cushion has a uniform thickness of between 0.5 and 2.0 cm.

6. The motor vehicle according to claim 1, wherein the cushion extends over the entire height of a front face of the exhaust muffler.

7. The motor vehicle according to claim 1, wherein the cushion is made of a deformable material, the specific gravity of which is between 0.1 and 0.65.

8. The motor vehicle according to claim 1, wherein the cushion is fastened to a front face of said heat shield by gluing.

9. The motor vehicle according to claim 1, wherein the cushion and the heat shield are made in one piece.

10. The motor vehicle according to claim 1, wherein said battery is a hybrid vehicle traction battery mounted in front of the exhaust muffler, said cushion being adapted to absorb the kinetic energy resulting from an impact at a rear of said motor vehicle.

* * * * *